(12) United States Patent
Kim et al.

(10) Patent No.: US 12,175,518 B2
(45) Date of Patent: *Dec. 24, 2024

(54) METHOD AND SYSTEM FOR AUTOMATED ASSIGNMENT OF DEVICES TO AN OPTIMAL RATE PLAN

(71) Applicant: Aeris Communications, Inc., San Jose, CA (US)

(72) Inventors: Hyungho Kim, Cupertino, CA (US); Subramanian Balakrishnan, Cupertino, CA (US); Jins George, Fremont, CA (US); Steve Dotolo, Tulsa, OK (US)

(73) Assignee: Aeris Communications, Inc., San Jose, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/564,721

(22) Filed: Dec. 29, 2021

(65) Prior Publication Data

US 2022/0122149 A1 Apr. 21, 2022

Related U.S. Application Data

(63) Continuation-in-part of application No. 16/161,369, filed on Oct. 16, 2018, now Pat. No. 11,216,860, which is a continuation of application No. 13/722,827, filed on Dec. 20, 2012, now Pat. No. 10,109,002.

(Continued)

(51) Int. Cl.
*G06Q 30/00* (2023.01)
*G06Q 30/0601* (2023.01)

(52) U.S. Cl.
CPC .............................. *G06Q 30/0631* (2013.01)

(58) Field of Classification Search
CPC ................................................ G06Q 30/06–08
See application file for complete search history.

(56) References Cited

U.S. PATENT DOCUMENTS 6,574,465 B2  6/2003  Marsh et al.
7,787,864 B2  8/2010  Provo
(Continued)

OTHER PUBLICATIONS

"Edocs Targets Reduced Customer Churn and Improved Profitability with New Customer-Self-Service Applications Suite for Telecommunications" Business Wire, Nov. 10, 2003 (https://dialog.proquest.com/professional/docview/667887852?accountid=131444) (Year: 2003).*

(Continued)

*Primary Examiner* — Ethan D Civan
(74) *Attorney, Agent, or Firm* — Shih IP Law Group, PLLC

(57) ABSTRACT

The present invention relates generally to a process for determining optimized communication rate plans for one or more communications devices across one or more communications networks. The present invention provides for assigning one or more devices operative on a communications network with one or more rate plans to an optimal rate plan. The present invention, in one or more embodiments provides of the one or more communication devices with a cost-effective rate plan solution based on usage profile of the one or more devices and available cost-savings programs available to the one or more devices.

21 Claims, 10 Drawing Sheets

Related U.S. Application Data

(60) Provisional application No. 63/153,546, filed on Feb. 25, 2021.

(56) References Cited

U.S. PATENT DOCUMENTS

| | | | |
|---|---|---|---|
| 8,005,726 B1 * | 8/2011 | Bao | H04M 15/58 |
| | | | 705/26.61 |
| 10,109,002 B2 * | 10/2018 | Dotolo | G06Q 30/0631 |
| 11,216,860 B2 * | 1/2022 | Dotolo | G06Q 30/0631 |
| 2002/0120540 A1 * | 8/2002 | Kende | G06Q 40/00 |
| | | | 705/1.1 |
| 2003/0169863 A1 * | 9/2003 | Hernandez | H04M 15/7655 |
| | | | 379/114.01 |
| 2010/0169234 A1 * | 7/2010 | Metzger | G06Q 10/067 |
| | | | 705/348 |
| 2010/0192144 A1 | 7/2010 | Schmit | |
| 2011/0106579 A1 | 5/2011 | Nair et al. | |

OTHER PUBLICATIONS

The International Search Report and the Written Opinion of the International Searching Authority, issued on Apr. 10, 2014, for International Application No. PCT/US2013/076000.

* cited by examiner

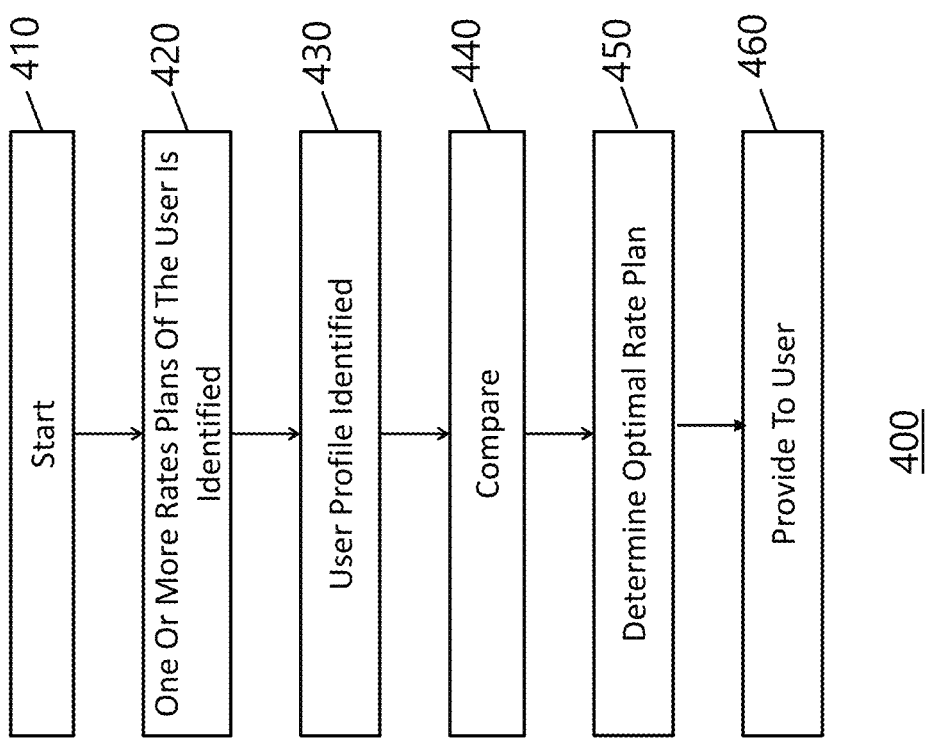

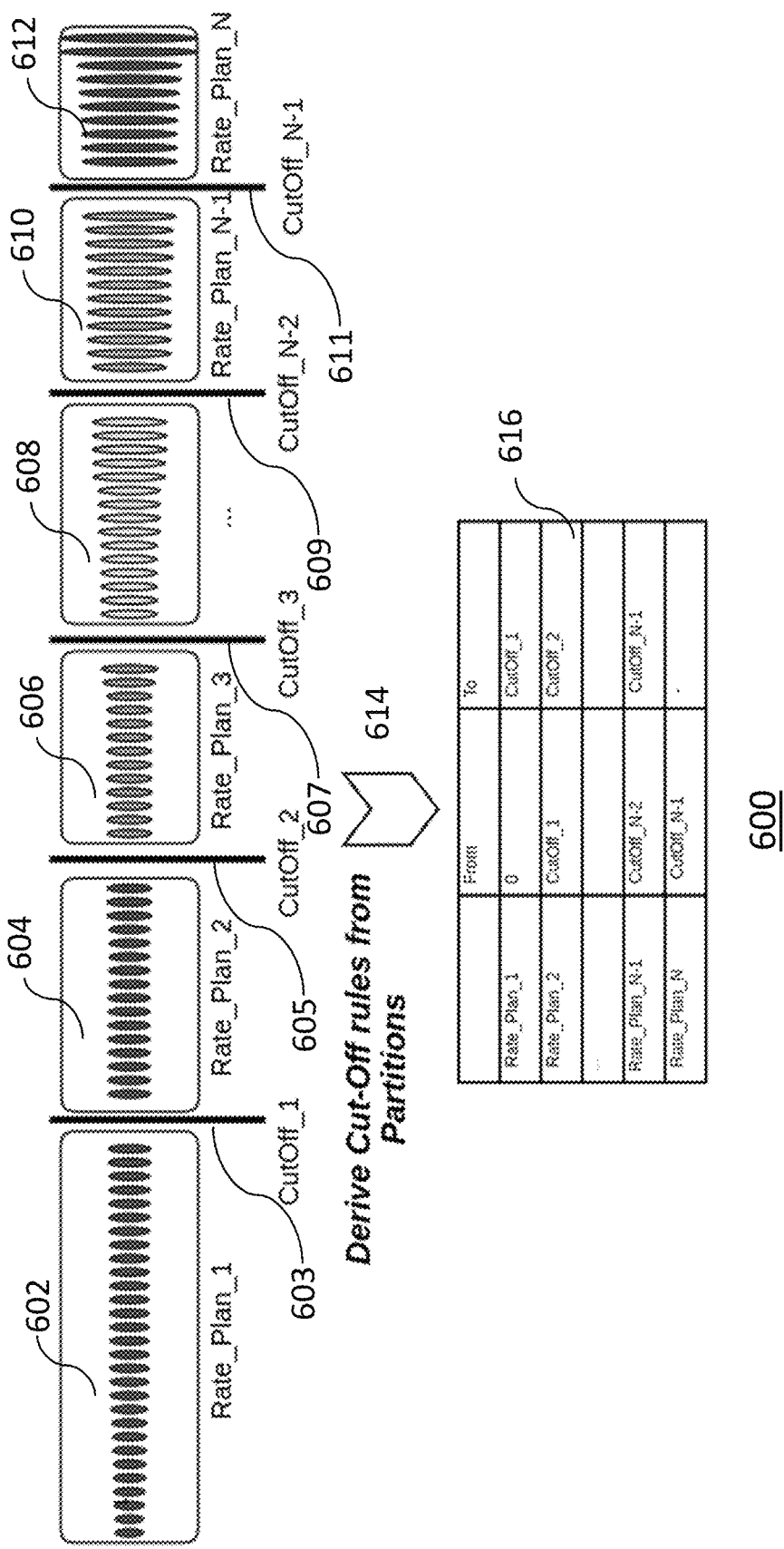

METHOD AND SYSTEM FOR AUTOMATED ASSIGNMENT OF DEVICES TO AN OPTIMAL RATE PLAN

CROSS-REFERENCE TO RELATED APPLICATION

This application claims priority under 35 USC 119(e) to U.S. provisional application Ser. No. 63/153,546, filed on Feb. 25, 2021, and is a Continuation-In-Part of U.S. Ser. No.: 16/161,369, filed Oct. 16, 2018; which is a Continuation of U.S. Ser. No.: 13/722,827, filed Dec. 20, 2012; all of which are incorporated herein by reference in their entirety.

FIELD OF THE INVENTION

The present invention relates generally to a process for determining optimized communication rate plans for one or more communications devices across one or more communications networks.

BACKGROUND OF THE INVENTION

Communications devices are used throughout most of the world and are often designed and developed to operate with at least one, if not more than one, communications network. Each communications device is uniquely identified within a network and is often uniquely identified within the network, thereby enabling a communications source device to contact the receiving device through connection points across the network. Similarly, each communications device is tracked on a network for its use of bandwidth in operation on one or more networks.

These communications devices are often in the form cellular phones, smartphones, or other telephonic-based equipment but may also include devices such as tablets, pads, and displays which are capable of connecting with and using a communications network's resources for communicating. Still other devices may include one-way communicating equipment, such as medical emergency or alarm-based equipment that contacts a receiving device or system across a network. The use of the term communications device or "device" herein is not intended to be limited to examples set forth, but rather incorporates and includes any device capable of communicating on, with, and/or across a communications network, wired or wireless, and thereby uses network resources of bandwidth to upload, download, transmit, receive, or transceive data. Examples of devices may include: laptops with 3G or WIFI capability; smartphones with 3G, 4G or CDMA/GSM; alarm systems across a publicly switched telephone network (PSTN) line; texting equipment; a machine-to-machine (M2M) environment; and similar.

In many applications, a communications device may not be physically connected with a communications network and may be able to connect with multiple communications networks owned by different entities. Tracking the use of a particular device on various networks is an important activity as the use of a network's bandwidth is typically the primary source of monetization for operators of a network.

FIG. 1 depicts a basic M2M communication network 100 having typical sensor-type devices 120, 130 and 140. Cell phones at 145 and 155 are also provided. In FIG. 1, the M2M network 100 has a central communication gateway 110 in which communications from devices 120, 130, 140, and 145 are linked with a service provider network 150. The linkage may be wired or wireless, and is depicted as the security camera 120 and the water alarm sensor 130 are in wireless communication with the gateway 110. Similarly, the traffic camera sensor 140 is in wired communication with the gateway, though one will appreciate that there are many variations to the type and protocol of communication for FIG. 1. As one can appreciate, there may be many variations for a M2M communication network and devices thereon. Further, smartphones and varied other devices may also be part of the network and communicate via varied means.

From FIG. 1, data sensed and obtained by the devices is transmitted across the M2M network to the service provider network 150 where the data may be shared as raw data or converted to information, often though software applications. Notification equipment 160 wirelessly receives the data from the service provider network 150, as may the cell phone 155, and acts in accordance with the received data for the specific event. For instance, where the notification equipment is an alert system to send a text to a building owner in the event of a water leak, and the water sensor has sent data indicating a water leak, the notification equipment will then trigger an event to notify the building owner. Similarly, from FIG. 1, where the user 170 receives a suite of rolling historical data as to traffic camera operation cycles, the user may then act accordingly based on the received cumulative information. The transmission and receipt of data across the network from varied devices can be tracked on a per device basis, a per grouping of device basis, and across the network. The usage of data by a device is often then billed to a device-owning consumer (or user) based on a consumption rate plan that provides for a certain amount of time and/or use of data by a device owned by the user.

Unfortunately, usage plans are often determined or selected based upon a user's expected use of the device across a network, which is often difficult to accurately track with ease. Typically, a device owner estimates an intended use amount, in time and/or bandwidth, and then begins to use the device and may not develop a routine cadence to routinely check daily usage amounts or similar. As a result, often a user may receive a billing from a network operator for the prior period of time (monthly or quarterly) where the user's use of the device on the network has exceeded the intended use, resulting in overages and network use costs that exceed the anticipated amount.

Operator networks are known to provide a historical review of a user's use on a network and make recommendations for a preferred rate plan to use for the following month. Similarly, a user may switch plans, choosing one operator's rate plan over another's for perceived benefits of costs, rate allowances, overages, credits, etc. These efforts to undertake a rate plan change require either the operator or the user to overtly recognize that another rate plan may be available or that the user's actual use exceeded his intended use, and a change is needed, based on historical information.

However, undertaking such an effort is contradistinctive to a network operator's monetization model and is also an activity that a user may not recognize is available, particular as the user has already committed to a rate plan, likely as a subscription with the purchase of a device, and is likely not current on available rate plan options or offerings.

The situation is compounded where a user is the owner of many devices, such as a smartphone, laptop, tablet and alarm system, all on the same operator network and under one rate plan based on a capped use amount. The situation is further compounded where a user is the owner of hundreds of devices, each possibly on a varied rate plan and differing network, and each being operated by one of a hundred different user types each having their own particular communication need (time, bandwidth, location, etc.). Such a situation may exist at an equipment leasing company or corporate entity, for instance.

It is therefore desirable to provide for determining a smart rate plan in relation to a user's profile and use characteristics which provides for a cost-effective rate plan for the user independent of the number of devices or rate plans the user may have.

Furthermore, the data usage for IoT devices tends to have high variance and non-normal statistical distribution across billing cycles. It is therefore desirable to provide a method and system to handle scenarios where there is no normal distribution of device usage.

SUMMARY OF THE INVENTION

The present invention fulfills these needs and has been developed in response to the present state of the art, and in particular, in response to the problems and needs in the art that have not yet been fully solved by currently available technologies.

One embodiment of the present invention includes a method for assigning one or more devices operative on a communications network to an optimal rate plan, including: identifying the one or more rates plans of the one or more devices; identifying a usage profile for the one or more devices, wherein the usage profile for the one or more devices includes usage characteristics for the one or more devices; comparing the usage profile for the one or more devices to one or more available rate plans; determining an optimal rate plan for the one or more devices from the available rate plans; and assigning the one or more devices to the optimal rate plan.

Another embodiment of the present invention provides a system for assigning one or more devices operative on a communications network to an optimal rate plan, having one or more devices, a processor, a database storing usage records for the one or more devices and one or more available rate plans, wherein the processor is provided with the instructions to: identify the one or more rates plans of the one or more devices; identify a usage profile for the one or more devices, wherein the usage profile for the one or more devices includes usage characteristics for the one or more devices; compare the usage profile for the one or more devices to one or more available rate plans; determine an optimal rate plan for the one or more devices from the available rate plans; and assign the one or more devices to the optimal rate plan.

A further embodiment of the present invention provides for a computer program product stored on a computer usable medium, having computer readable instruction for causing a computer to control an execution of an application to perform a method for assigning one or more devices operative on a communications network to an optimal rate plan, including: identifying the one or more rates plans of the one or more devices; identifying a usage profile for the one or more devices, wherein the usage profile for the one or more devices includes usage characteristics for the one or more devices; comparing the usage profile for the one or more devices to one or more available rate plans; determining an optimal rate plan for the one or more devices from the available rate plans; and assigning the one or more devices to the optimal rate plan.

BRIEF DESCRIPTION OF DRAWINGS

FIG. 4 sets forth a logic flow diagram for the present invention in accordance with one or more preferred embodiments.

FIG. 6 illustrates a system and method for automatically assigning one or more devices to an optimal rate plan in accordance with one or more embodiments of the present invention.

DETAILED DESCRIPTION OF PREFERRED EMBODIMENTS

The present invention relates generally to a process for determining optimized communication rate plans for one or more communications devices across one or more communications networks.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
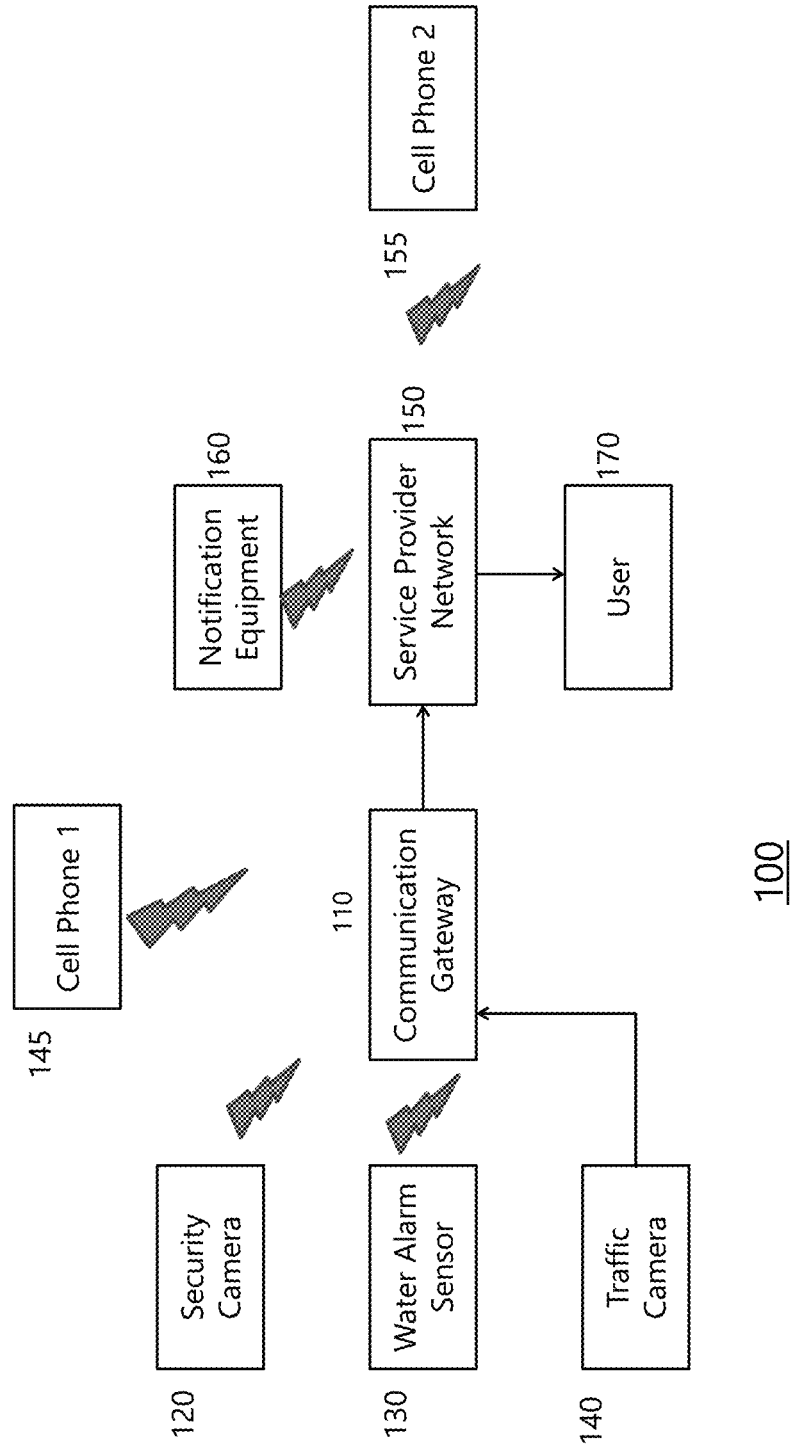
FIG. 1 depicts a basic M2M communication network having typical sensor-type devices.
Figure 2:
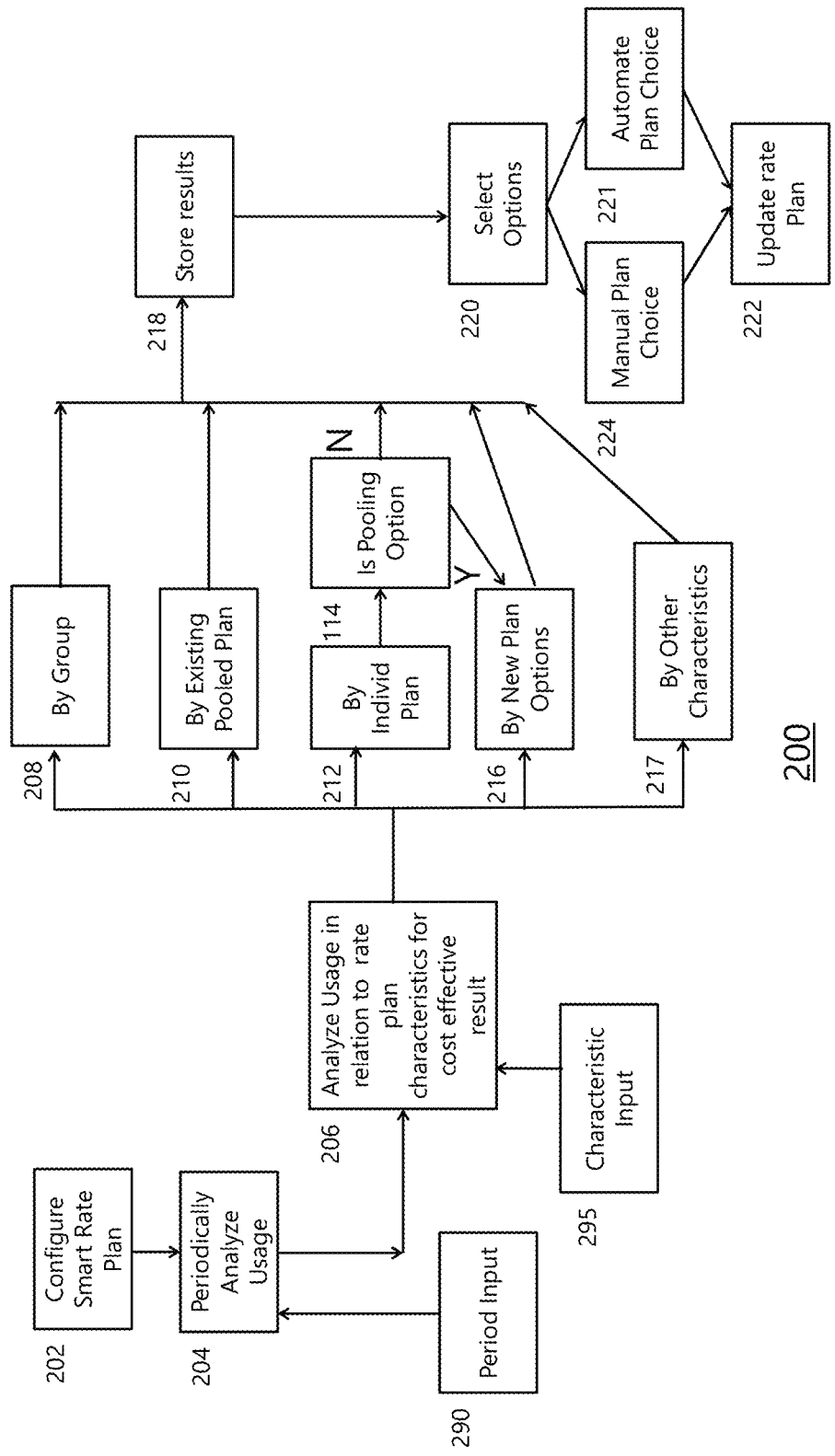
FIG. 2 sets forth a smart rate plan process in accordance with one or more embodiments of the present invention.

FIG. 2 sets forth a smart rate plan process 200 in accordance with one or more embodiments of the present invention. From FIG. 2, smart rate plans are configured, at 202. Inputs to the configured rate plans may include present rate plan offerings of the user, information from a user profile, anticipated offerings, location-based limitations, device-related constraints, etc. At 204, a user has been identified as has a user profile associated with that user, whereafter a usage analysis based upon a time period is determined. A predetermined period of time may typically include daily, weekly, monthly, quarterly, semi-annually, yearly, or similar.

At 206, preferably, in relation to one or more use characteristics and user rate plan characteristics, an analysis to determine an optimal rate plan is undertaken by assessing the existing rate plan, the user profile, one or more use characteristics, and available rate plans and options. A user profile may include one or more user characteristics such as individual devices, device groups, rate plans, usage pools, account overview, etc. A user rate plan characteristic may include but not be limited to a grouping, a pooling, and an individualized plan.

The analysis of 206 can be undertaken in one or more steps set forth as 208-217. At 208, an assessment is performed to analyze and determine an optimal plan when grouping is a primary determinant. Based on an analysis by group, a set of results is determined and preferably stored at 218. The results stored at 218, will be used as input to determine an optimal rate plan choice at 220.

At 210, an assessment is performed to analyze and determine an optimal plan when considering pooled plans is a primary determinant. Based on an analysis by pooled plans, a set of results is determined and preferably stored at 218. The results stored at 218, will be used as input to determine an optimal rate plan choice at 220. The comparison of available rate plans versus use characteristics is intended to yield a determination of a beneficial rate plan for a particular user in view of the compared one or more user characteristics.

At 212, an assessment is performed to analyze and determine an optimal plan when considering individualized plans is a primary determinant. Based on an analysis by individualized plans, a set of results is determined and preferably stored at 218. Optionally, a further consideration of whether the pooling is option 214 is evaluated, where if it is, new plans may also be considered at 216. The results stored at 218, will be used as input to determine an optimal rate plan choice at 220.

At 216, an assessment is performed to analyze and determine an optimal plan when considering new plans is a primary determinant. Based on an analysis by new plans, a set of results is determined and preferably stored at 218. The results stored at 218, will be used as input to determine an optimal rate plan choice at 220.

At 217, an assessment is performed to analyze and determine an optimal plan when considering other factors is a primary determinant. Based on an analysis by other factors, a set of results is determined and preferably stored at 218. The results stored at 218, will be used as input to determine an optimal rate plan choice at 220. Other factors may include information and data that can be obtained from user account data, user profile, use characteristics, device information, network information, and similar.

At 220, based on the inputted data, an optimal rate plan can be determined which will fulfill the needed criteria of the user, such as but not limited to the most cost-effective rate plan. Once determined the optimal rate plan can be review by or with the user and updated to reflect the user's needs. The update may be manually performed at 224 or may be automatically performed at 221, based upon user criteria. The optimal plan then becomes the user's activated and current plan via updating at 222.

Use characteristics of a user plan may include, but not be limited to, use of bandwidth, use of data, frequency of calls, length of calls, amount of data used, data uploads, data downloads, data transmissions, voice transmissions, types of data used, amount of data traffic, incoming data traffic, outgoing data traffic, type of data plan, history of data usage, and history of cost of data plan, etc.

In operation, the present invention, in determining a most cost-effective rate plan, after a user's use is compared with their rate plan and available rate plans, may determine, based on a comparison of one or more use characteristics, that the present plan is the most cost-effective and so no change is recommended. In another embodiment, based on one or more other use characteristics, it may be determined that a newly-available rate plan is a better solution for the user and the new plan is recommended to the user or dynamically updated as active rate plan to the user's account. In a further operation of the present invention, possible plans may be assessed by group, then pooled plans, then individual plans, and from this assessment an improved options can be provided to the user.

Figure 3:
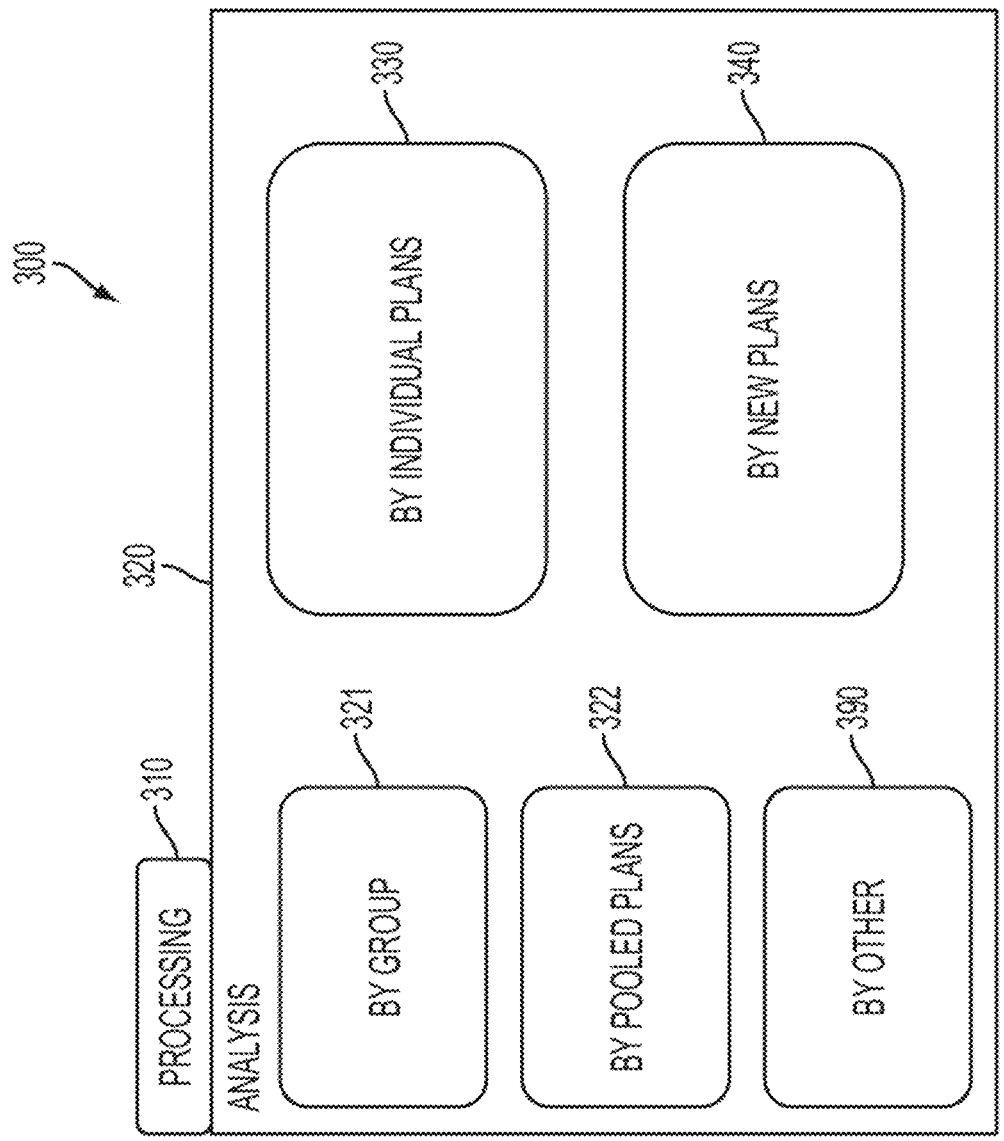
FIG. 3 sets forth a detail of the processing steps for the present invention in one or more preferred embodiments.

FIG. 3 sets forth a detail of the processing steps 300 for the present invention in one or more preferred embodiments. From FIG. 3, the processing 310 of the present invention performs an analysis 320 which analyzes an existing rate plan with possible other rate plans by comparing user profile information, use characteristics, and available rate plans with one or more rate plan characteristics. Rate plan characteristics may include one or more of a grouping 321, a pooling 322, and an individualized plan 330. Further, such may include a comparative assessment as in view of other available rate plans 340 and by other comparative criteria that may be available from information of the user's account, user's profile or use characteristics 340.

FIG. 4 sets forth a logic flow diagram 400 for the present invention in accordance with one or more preferred embodiments. From FIG. 4, the process of determining an intelligent rate plan for a user having one or more devices operative on a communications network with one or more rate plans is started at 410. At 420, one or more rate plans of the user are identified. At 430, a user profile of the user having one or more use characteristics is identified. At 440, the one or more use characteristics and the one or more rate plans of the user to one or more available rate plans for the user are compared. At 450, an optimal rate plan for the user from the available rate plans in relation to the step of comparing is determined. At 460, the determined optimal rate plan is provided to the user. In a preferred embodiment the determination of the optimal rate plan is provided to the user via a web-enabled means, such as through a website or email, in which the prior user rate plan and the preferred optimal rate plan are set forth along with calculations reflecting why the optimal choice was determined.

In operation, the present invention in accordance with one or more embodiments provides an improved rate plan choice for a user of one or more devices on a communications network. For example, in one embodiment, use data of a user is identified and has one or more user profile characteristics including the data used by the user over an annual period of time. The present invention assesses the annual use data and determines that the average data use per device owned by the user in months 3, 4, 5 and 6 is 10 MB, across the collective account. The present invention, following assessment, also determines that the average data use per device owned by the user in months 1, 2, and 7-12 is 1 MB, across the collective account. The present invention may then recommend a forward rate plan strategy to be one of modifying the user's rate plan each month to plan for a higher use or a lower use for a respective month to reduce cost, providing an annual rate plan with a rate use plan cap reducing cost, and automatically updating the user's plan each month to provide the optimum cost efficiency.

In a further operation, the present invention in accordance with one or more embodiments, automatically provides improved multiple rate plans for a user of one or more devices on a communications network. For example, in one embodiment, use data of a user is evaluated in relation to the use data of other individual devices or groups of devices that participate in rate plan pooling. The present invention rates traffic of each of the participating plans on a predetermined periodic basis, for instance such as a daily basis. In so doing, the present invention enables a customer to view bill-to-date cost information as it relates to each possible rate plan, where data can be displayed to the user in a variety of ways including by device level, pool level, account, rate plan, etc. In a preferred embodiment, the present invention also may rate the plans for the user and automatically select the least cost plan for the user and/or one or more devices, optionally for a fee.

Additionally or alternatively, the data usage for IoT devices may tend to have high variance and non-normal statistical distribution across billing cycles. It is therefore desirable to provide a method and system to handle scenarios where there is no normal distribution of device usage by automatically assigning one or more devices to an optimal rate plan.

For example, IoT developers need to have a good understanding of the device data usage in order to set up the correct rate plan for IoT devices in order to minimize the IoT program operational cost. But it is not easy to estimate the data usage for IoT devices, as the data usage for IoT devices tends to have high variance and non-normal statistical distribution across billing cycles. CMP (Connectivity Management Platform) product has offerings such as rate plan pooling to handle some of the variance issues by grouping similar devices into one rate plan pool. But rate plan pooling works only when we have a normal distribution of device usage across billing cycles with a median close to device expected usage. This invention targets to handle scenarios when there is no normal distribution of device usage within possible rate plan pools.

Usage analysis may be based upon usage data collected over a specified or pre-determined time period and may be performed for a particular user or a customer account or a group of devices within a particular customer account. The predetermined period of time may typically include daily, weekly, quarterly, semi-annually, yearly, or similar and the usage analysis may include data usage by a group of one or more devices for a particular user or customer. The usage analysis may be used directly or for forecasting future data usage by the group of one or more devices for a particular user or customer.

It may be determined that a newly available rate plan or another rate plan which may be previously available but now determined to be an optimal rate plan based on usage data analysis is a better solution for the user and the new plan is recommended to the user or dynamically updated as active rate plan to the user's account. The invention described herein may thus automatically assign one or more devices to optimal rate plan/s retroactively and/or non-retroactively. A retroactive adjustment of rate plan is defined as allowing a rate plan change until the end of the billing cycle. If a retroactive adjustment is not allowed or resource usage distribution is not known, projected or anticipated usage may be used for automatically assigning one or more devices to optimal rate plan/s. Once the devices are assigned to the optimal rate plan, the data usage by those devices is billed according to the optimal rate plan to which the devices are assigned to.

The invention applies a combinatorial optimization algorithm along with a machine learning algorithm on a large-sized dataset, which is not feasible with a pen and paper or any manual analysis tools like Microsoft Excel. This invention is unique in automating the rate plan assignment to one or more devices considering multiple factors like usage, pooling, and multiple rate plans.

It may be provided as the automatic optimal rate plan assignment to one or more devices feature for a user as an option to enable automatic rate plan balancing/assignment. The algorithm may be packaged as a python cloud function or stream processing pipeline in product offering.

Thus, in an embodiment, an optimal rate plan may be chosen for one or more devices using an algorithm described herein and assign that rate plan to those one or more devices. The algorithm looks at all the device usage and figures out the best combination of devices to fit the rate plan(s) optimally. (For example, a group of X devices goes to rate plan A, a group of Y devices goes to rate plan B, etc.) The pricing elements of rate plan may include MRC (Monthly Recurring Charge), Included-Units, Overage Rate, etc. Device usage analysis may be based upon a time period which may be pre-determined for a particular user or a customer account. The predetermined period of time may typically include daily, weekly, monthly, quarterly, semi-annually, yearly, or similar and the usage analysis may include data usage by a group of one or more devices for a particular user or customer. The usage analysis may be used directly or for forecasting future data usage by the group of one or more devices for a particular user or customer.

In an embodiment, resource usages under the same rate plan can be pooled together. For each $RatePlan_j$ which is assigned $N_j$ users and $TotalUsage_j$, the cost can be evaluated as $MRC_j*N_j+OverageRate_j*\max(0, TotalUsage_j-IncludedUnit_j*N_j)$ unless other constraints exist.

In an embodiment, rate plan change may be allowed until the end of the billing cycle.

In a scenario, MVNO (mobile virtual network operator) or an entity with a number of IoT devices gets a particular rate plan for those devices from MNO (mobile network operator). The algorithm described herein allows automated comparison of the usage to all the available rate plans to choose the best rate plan. The algorithm described herein may further allow data usage analysis for that month and retroactively choose the rate plan that is determined to be optimal for that usage. The chosen rate plan may then be applied retroactively or where the MNO does not allow a retroactive rate plan adjustment, the chosen rate plan may be applied based on projected or anticipated usage for those devices.

A computer-implemented method, system and computer program product for assigning one or more devices operative on a communications network to an optimal rate plan are disclosed.

One embodiment of the present invention includes a method for assigning one or more devices operative on a communications network to an optimal rate plan, including: identifying the one or more rates plans of the one or more devices; identifying a usage profile for the one or more devices, wherein the usage profile for the one or more devices includes usage characteristics for the one or more devices; comparing the usage profile for the one or more devices to one or more available rate plans; determining an optimal rate plan for the one or more devices from the available rate plans; and assigning the one or more devices to the optimal rate plan.

Another embodiment of the present invention provides a system for assigning one or more devices operative on a communications network to an optimal rate plan, having one or more devices, a processor, a database storing usage records for the one or more devices and one or more available rate plans, wherein the processor is provided with the instructions to: identify the one or more rates plans of the one or more devices; identify a usage profile for the one or more devices, wherein the usage profile for the one or more devices includes usage characteristics for the one or more devices; compare the usage profile for the one or more devices to one or more available rate plans; determine an optimal rate plan for the one or more devices from the available rate plans; and assign the one or more devices to the optimal rate plan.

A further embodiment of the present invention provides for a computer program product stored on a computer usable medium, having computer readable instruction for causing a computer to control an execution of an application to perform a method for assigning one or more devices operative on a communications network to an optimal rate plan, including: identifying the one or more rates plans of the one or more devices; identifying a usage profile for the one or more devices, wherein the usage profile for the one or more devices includes usage characteristics for the one or more devices; comparing the usage profile for the one or more devices to one or more available rate plans; determining an optimal rate plan for the one or more devices from the available rate plans; and assigning the one or more devices to the optimal rate plan.

The following description is presented to enable one of ordinary skill in the art to make and use the above-mentioned embodiments of the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 5A:
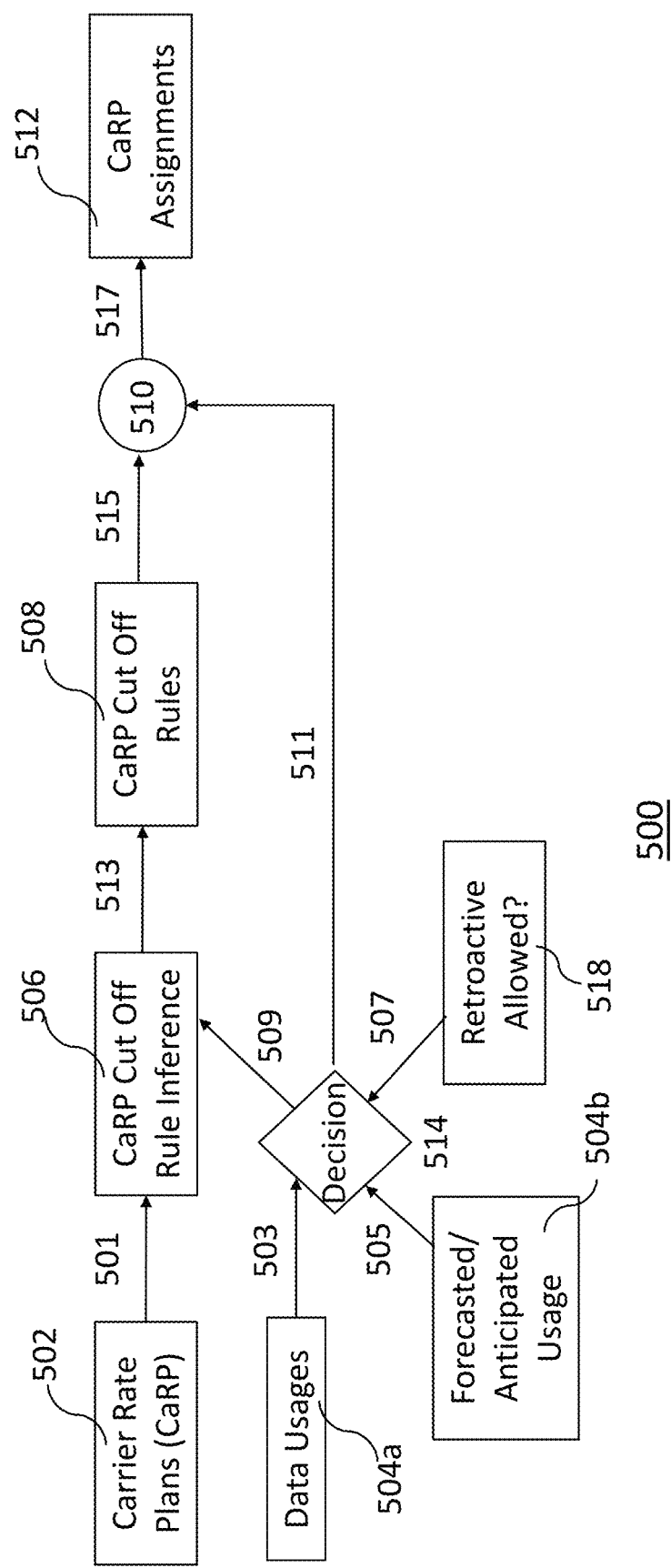
FIG. 5A illustrates a system and method for automatically assigning one or more devices to an optimal rate plan in accordance with one or more embodiments of the present invention.

FIG. 5A illustrates a system and method 500 for automatically assigning one or more devices to optimal rate plan/s in accordance with one or more embodiments of the present invention. For example, carrier rate plan (CaRP) rule inference 506 receives available carrier rate plans (CaRP) 502 via step 501 and data usage 504a via step 503 and/or forecasted or anticipated data usage 504b via step 505, which may be derived from analyzing the usage data 504a for the one or more devices for that customer is received by a decision-making component 514. Usage analysis may be based upon a time period and may be performed for a particular user or a customer account or a group of devices within a particular customer account. The predetermined period of time may typically include daily, weekly, monthly, quarterly, semi-annually, yearly, or similar and the usage analysis may include data usage by a group of one or more devices for a particular user or customer. The usage analysis may be used directly or for forecasting future data usage by the group of one or more devices for a particular user or customer.

The terms Carrier Rate Plan (CaRP) and Customer Rate Plan (CuRP) as used throughout the specification may be defined as follows. The Carrier Rate Plan (CaRP) may be defined as a rate plan offered by Mobile network operator (MNO) (e.g., VZW, AT&T, T-Mobile, Vodafone, etc.) to Mobile virtual network operator, (MVNO) (e.g., Aeris, etc.), whereas the Customer Rate Plan (CuRP) may be defined as a rate plan between customers and an MVNO, e.g., Aeris, etc. The Customer Rate Plan (CuRP) may also be defined as a rate plan between customers and mobile network operator (MNO), (e.g., VZW, AT&T, T-Mobile, Vodafone, etc.). Thus, the customer rate plans described herein may be a rate plan between customers and mobile network operator (MNO), (e.g., VZW, AT&T, T-Mobile, Vodafone, etc.) and/ or a rate plan between customers and mobile virtual network operator (MVNO), (e.g., Aeris, etc.). The rate plan adjustment described herein may be applicable to carrier rate plans as well as customer rate plans.

The decision-making component 514 also receives rules for allowing retroactive assignment of optimal rate plans via step 507 from retroactive rules database 518 and feeds the decision to (CaRP) rule inference 506. The (CaRP) rule inference 506 derives the optimal cut-off rules 508 via step 513 from the resource usage distribution 504a or forecasted or anticipated data usage 504b. The cut-off rules 508 may include lower and/or upper bounds for each carrier rate plan 502 as illustrated on FIG. 6 and described in detailed description accompanying FIG. 6, and are used via step 515 along with data usage 504a or forecasted/anticipated data usage 504b via step 511 to generate the optimal assignments 510 of carrier rate plan to a device for minimal cost via step 517 resulting in final assignment of carrier rate plan to a device 512. It may be determined that a newly available rate plan or another rate plan which may be previously available but now determined to be an optimal rate plan based on usage data analysis is a better solution for the user and the new plan is recommended to the user or dynamically updated as active rate plan to the user's account.

The carrier rate plan (CaRP) CuttOff rule inference 506 uses data usage 504a or forecasted/anticipated data usage 504b via step 509 using an algorithm illustrated in FIG. 6 and described in detail in the description accompanying FIG. 6.

Figure 5B:
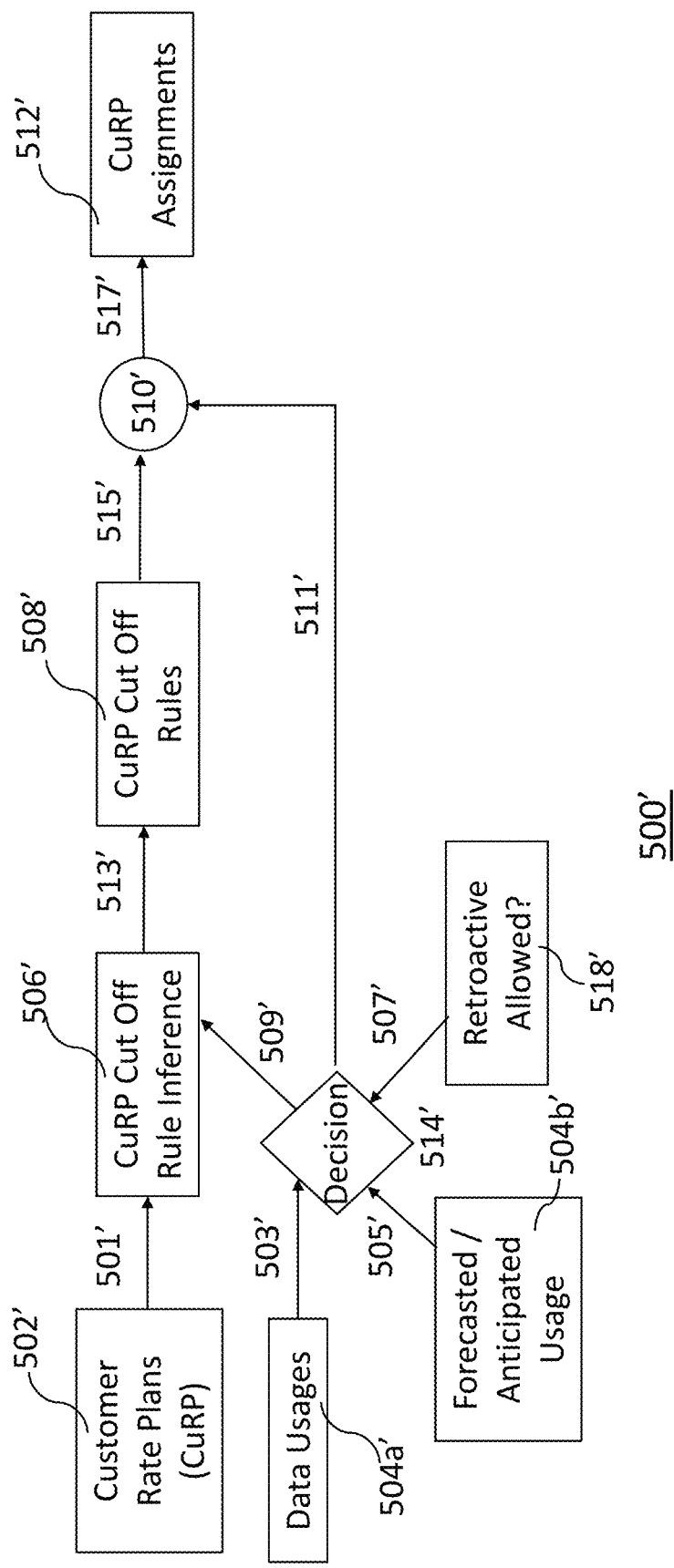
FIG. 5B illustrates a system and method for automatically assigning one or more devices to an optimal rate plan in accordance with one or more embodiments of the present invention.

FIG. 5B illustrates a system and method for automatically assigning one or more devices to an optimal rate plan in accordance with one or more embodiments of the present invention. For example, customer rate plan (CuRP) rule inference 506' receives available customer rate plans (CuRP) 502' via step 501'. Data usage 504a' via step 503' and/or forecasted/anticipated data usage 504b' via step 505', which may be derived from analyzing the usage data 504a' for the one or more devices for that customer is received by a decision-making component 514'. Usage analysis may be based upon a pre-determined time period and may be performed for a particular user or a customer account or a group of devices within a particular customer account. The predetermined period of time may typically include daily, weekly, monthly, quarterly, semi-annually, yearly, or similar and the usage analysis may include data usage by a group of one or more devices for a particular user or customer. The usage analysis may be used directly or for forecasting future data usage by the group of one or more devices for a particular user or customer.

The decision-making component 514' also receives rules for allowing retroactive assignment of optimal rate plans vis step 507' from retroactive rules database 518' and feeds the decision to (CuRP) rule inference 506'. The (CuRP) rule inference 506' derives the optimal cut-off rules 508' via step 513' from the resource usage distribution 504a' or forecasted/anticipated data usage 504b'.

The cut-off rules 508' may include lower and/or upper bounds for each customer rate plan 502' as illustrated on FIG. 6 and described in detailed description accompanying FIG. 6, and are used via step 511' along with data usage 504a' or forecasted/anticipated data usage 504b' via step 515' to generate the optimal assignments 510' of customer rate plan to a device for minimal cost via step 517' resulting in final assignment of customer rate plan to a device 512'. It may be determined that a newly available rate plan or another rate plan which may be previously available but now determined to be an optimal rate plan based on usage data analysis is a better solution for the user and the new plan is recommended to the user or dynamically updated as active rate plan to the user's account.

The customer rate plan (CuRP) CutOff rule inference 506' uses data usage 504a' or forecasted/anticipated data usage 504b' to calculate CutOff rules based on data usage 504a' or forecasted/anticipated data usage 504b' via step 509' using an algorithm illustrated in FIG. 6 and described in detail in the description accompanying FIG. 6.

FIG. 6 illustrates a system and method for assigning automated optimal rate plans in accordance with one or more embodiments of the present invention and may be used for carrier rate plan (CaRP) illustrated in FIG. 5A as well as customer rate plane (CuRP) illustrated in FIG. 5B. For example, FIG. 6 illustrates the system and process 600 for deriving optimal cut off rules shown as 508(CaRP) or 508'(CuRP) and/or 708(CaRP) or 708'(CuRP) in FIG. 5A(CaRP), 5B(CuRP), 7A(CaRP) and 7B(CuRP) respectively. The method and system searches for optimal partitioning of resource usages to minimize the total cost and constructs the cut-off rules from the optimal partitions, for example, CutOff_1 603 and CutOff_2 605 for Rate_Plan_2 604, ... CutOff_N-2 609 and CutOff_N-1 611 for Rate_Plan_N-1 610 etc. as shown in FIG. 6. For example, CutOff_i serves as the upper bound of Rate_Plan_i and the lower bound of Rate_Plan_i+1.

The method and system searches for optimal partitioning of resource usages to minimize the total cost and constructs the cut-off rules via step 614 from the optimal partitions using the following algorithm illustrated by table 616.

$$minCost(r, n) = \begin{cases} pooledCost(1, 1, n), & \text{if } r = 1 \\ 0, & \text{if } n = 0 \\ \min_{s=1,2,...r} \{pooledCost(s, 1, 1)\}, & \text{if } n = 1 \\ \min\{minCost(r-1, n) \min_{j=1,2,...n} \{minCost(r-1, j-1) + pooledCost(r, j, n)\}\}, & \text{otherwise} \end{cases}$$

$$pooledCost(r, i, j) = f_r\left(j - i + 1, \sum_{k=i}^{j} u_k\right)$$

Given an ordered set of rate plan functions $\{f_1, f_2, f_3 \ldots f_{R-1}, f_R\}$ for rate plans 1 ... rate plan n and an ordered set of usages $\{u_1, u_2, u_3 \ldots u_N\}$ such that $u_1 <= u_2 <= u_3 \ldots <= u_N$, the optimal cost function minCost (r, n) is defined as a function which returns an optimal (minimal) cost for usages $u_1, u_2, u_3 \ldots$ un using only subset of $\{f_1, f_2, f_3, \ldots, f_r\}$.

Pooled rate plan function $f_r$ (m, u) in the set $\{f_1, f_2, f_3 \ldots f_{R-1}, f_R\}$ is a function that returns cost for the number of users (m) and total usages of the users (u). A typical form of $f_r$ which is defined by MRC (Monthly Recurring Charge), OverageRate, IncludedUnits can be:

$$f_r(m, u) = MRC_r \times m + OverageRate_r \times \max(0, u - IncludedUnits_r \times m)$$

Let pooledCost (r, i, j) be a pooled cost function for usages $u_i, u_{i+1}, u_{i+2} \ldots u_j$ using $f_r$. Then minCost (r, n) can be defined as sub-problems recursively.

i) in the case RatePlan$_r$ is not used: The minimal cost minCost (r, n) falls onto minCost (r−1, n) as we can simply exclude the RatePlan$_r$.

ii) in the case RatePlan$_r$ is used: The usage $u_1, u_2, u_3 \ldots$ un can be partitioned into two groups $\{u_1, u_2, u_3 \ldots u_{j-1}\}$ and $\{u_j, u_{j+1}, \ldots u_m\}$ then the first group can be optimized using subset of $\{f_1, f_2, f_3, \ldots, f_{r-1}\}$ and the second group is assigned to $f_r$, so the minimal cost minCost (r, n) becomes minCost (r−1, j−1)+pooledCost (r, j, n). We can pick the minimal one among those.

iii) base cases: the minCost(1, n) is the minimal cost that uses only f1 for usages $u_1, u_2, u_3 \ldots u_n$. So minCost(1, n)=pooledCost(1, 1, n); and M(r, 1) is the minimal cost for usage $u_1$ utilizing rate plans $\{f_1, f_2, f_3 \ldots f_r\}$, and we can pick the optimal $f_r$ for $u_1$. So M(r, 1)=minimum value of pooledCost(i, 1, 1), for all i<=r.

Figure 7A:
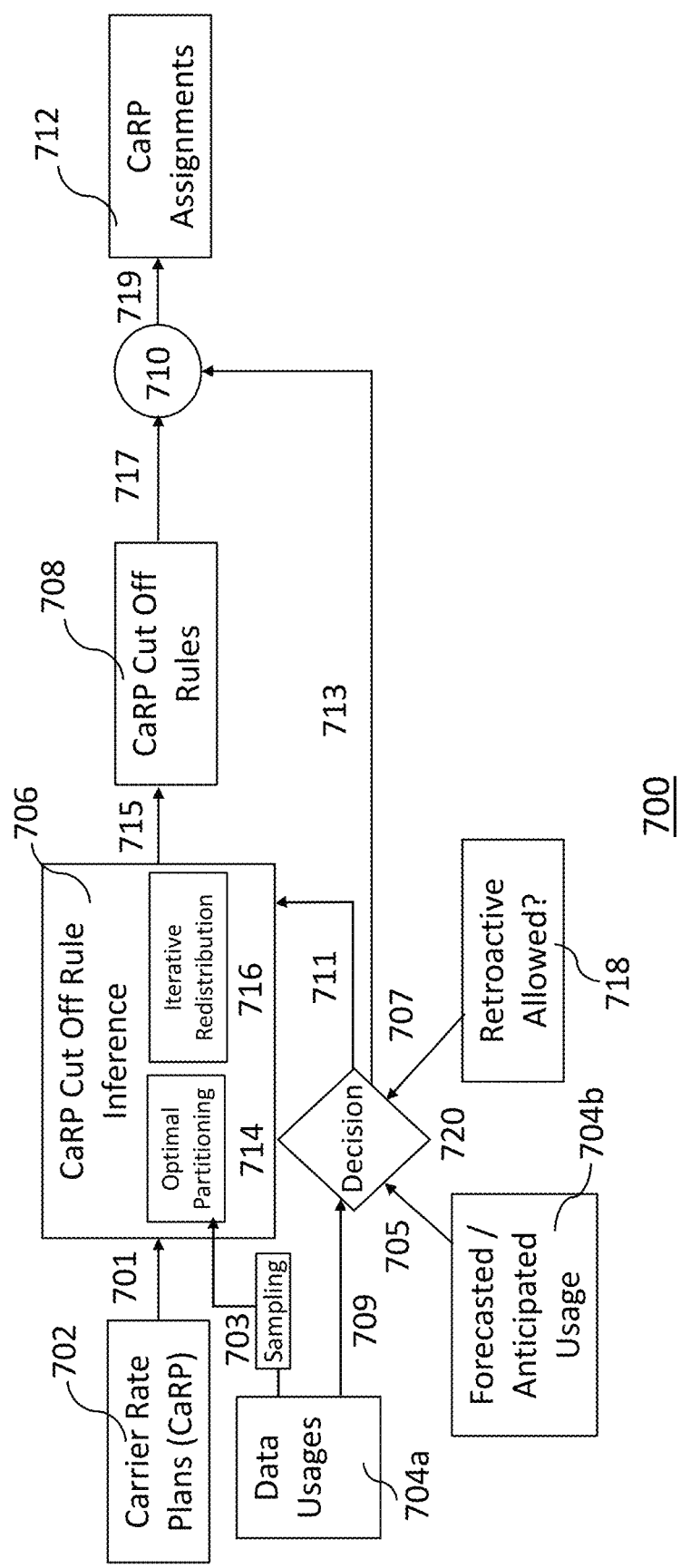
FIG. 7A illustrates a system and method for automatically assigning one or more devices to optimal rate plan in accordance with one or more embodiments of the present invention.
Figure 7B:
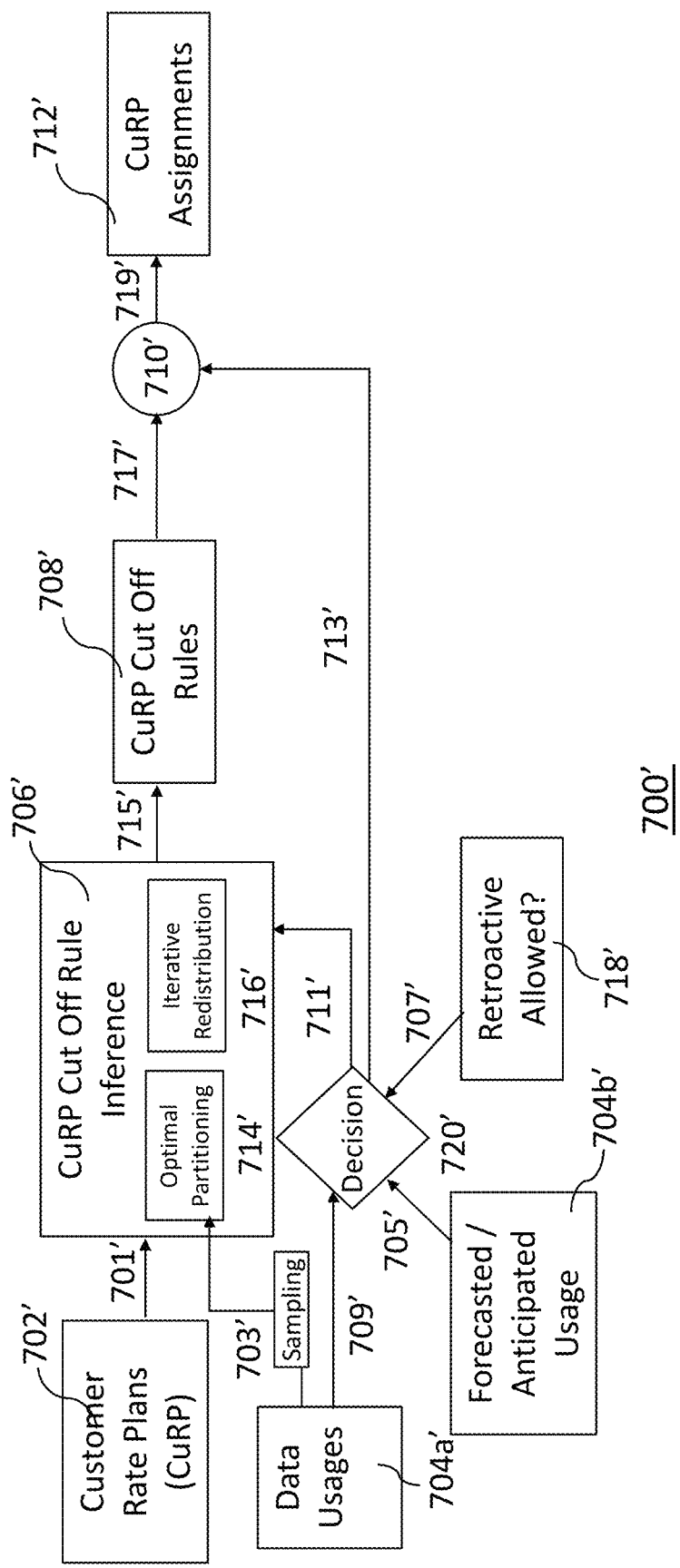
FIG. 7B illustrates a system and method for automatically assigning one or more devices to optimal rate plan in accordance with one or more embodiments of the present invention.

FIGS. 7A and 7B illustrate systems and methods for assigning automated optimal rate plans in accordance with one or more embodiments of the present invention and may be used for carrier rate plan (CaRP) illustrated in FIG. 5A as well as customer rate plane (CuRP) illustrated in FIG. 5B respectively. Usage analysis may be based upon a time period and may be performed for a particular user or a customer account or a group of devices within a particular customer account. The predetermined period of time may typically include daily, weekly, monthly, quarterly, semi-annually, yearly, or similar and the usage analysis may include data usage by a group of one or more devices for a particular user or customer. The usage analysis may be used directly or for forecasting future data usage by the group of one or more devices for a particular user or customer.

The algorithm 506 and 506' illustrated in FIGS. 5A and 5B or as 706 and 706' illustrated in FIGS. 7A and 7B may be implemented in a direct recursive method or using dynamic programming. If the algorithm 506 (for CaRP) or 506' (for CuRP) illustrated in FIGS. 5A and/or 5B is implemented using direct recursive method, it will have exponential time complexity. If implemented using dynamic programming, it'll have polynomial time complexity. For example, the algorithm 506 (for CaRP) or 506' (for CuRP) as illustrated in FIGS. 5A (for CaRP) or 5B (for CuRP) may have an exponential time complexity and may struggle with even a small number of usages. To solve this in polynomial time, dynamic programming may be used.

The time complexity of the implementation may be described as follows:

| Implementation | Complexity | Max Input # (1 hr time out) |
|---|---|---|
| Direct Recursive | $O(K^n)$ | <10 |
| Bottom-up Dynamic Programming | $O(K*N^3)$ $O(K*N^2)$ | <100,000 |
| Bottom-up Dynamic Programming + Sampling | $O(K*M^2 + N*\log(N))$ | — |

Where K represents number of rate plans, N represents number of users (devices) and M represents sampling size.

For example, as illustrated in FIG. 7A for Carrier Rate Plan (CaRP) and 7B for Customer Rate Plan (CuRP), to deal with a large number of usages in limited time constraints, sampled usages may be used for CaRP CuttOff rule inference 706 or CuRP CuttOff rule inference 706' respectively.

For example, as illustrated in FIG. 7A for Carrier Rate Plan (CaRP), the data usage 704a or forecasted/anticipated data usage 704b may undergo evenly spaced sampling 703 to reduce overage or the data size.

The method and system searches for optimal partitioning 714 (for CaRP) or 714' (for CuRP) of resource usages 704a or forecasted/anticipated data usage 704b to minimize the total cost and constructs the cut-off rules 708 (for CaRP) or 708' (for CuRP) via step 715 from the optimal partitions using the following algorithm illustrated by table 616 as described in FIG. 6.

Due to the sampling process 703, sampling errors may be incurred, and the approximate distribution by sampling may be slightly different than the distribution of the entire population, especially when there is a presence of outliers. This may cause the results of partitioning 714 (for CaRP) or 714' (for CuRP) to be less than optimal. To alleviate this, a second optimization such as iterative redistribution 716 may be used.

Unlike the previous step of partitioning 714), which uses the sampled data usages from step 703, this process of iterative redistribution 716 uses the entire population (the whole set of data usages) 704a via step 709 or forecasted/anticipated data usage 704b via step 705 which may be derived from the data usage 704a, and iteratively searches a better partitioning by moving the partitioning boundaries via step 716. This process 716 may continue until two consecutive iterations yield the same partitioning.

The decision-making component 720 also receives rules for allowing retroactive assignment of optimal rate plans vis step 707 (from retroactive rules database 718 and feeds the decision to rule inference 706.

The rule inference 706 derives the optimal cut-off rules 708 via step 715 from the resource usage distribution 704a or forecasted/anticipated data usage 704b.

The final step of assigning devices to the optimal rate plans is illustrated as step 719. The optimal rate plans are selected by looking up the Cutoff Rules 708 against the data usage of the devices 704a or forecasted/anticipated data usage 704b.

The cut-off rules 708 may include lower and/or upper bounds for each carrier rate plan 702 as illustrated on FIG. 6 and described in detailed description accompanying FIG. 6, and are used via step 713 along with data usage 704a or forecasted/anticipated data usage 704b via step 717 to generate the optimal assignments 710 of carrier rate plan to a device for minimal cost via step 719 resulting in final assignment of carrier rate plan to a device 712. For example, if data usage of a device is between CutOff_j−1 and CutOff_j, as illustrated in FIG. 6, Rate_Plan_j will be assigned for the device via step 719. Once the devices are assigned to the optimal rate plan, the data usage by those devices is billed according to the optimal rate plan to which the devices are assigned to.

Similarly, for example, as illustrated in 7B for Customer Rate Plan (CuRP), to deal with a large number of usages in limited time constraints, sampled usages may be used for CuRP CuttOff rule inference 706'. For example, the data usage 704a' or forecasted/anticipated data usage 704b' may undergo evenly spaced sampling 703' to reduce overage or the data size.

The method and system searches for optimal partitioning 714' of resource usages 704a' or forecasted/anticipated data usage 704b' to minimize the total cost and constructs the cut-off rules 708' via step 715' from the optimal partitions using the following algorithm illustrated by table 616 as described in FIG. 6.

Due to the sampling process 703', sampling errors may be incurred, and the approximate distribution by sampling may be slightly different than the distribution of the entire population, especially when there is a presence of outliers. This may cause the results of partitioning 714' to be less than optimal. To alleviate this, a second optimization such as iterative redistribution 716' may be used.

Unlike the previous step of partitioning 714', which uses the sampled data usages from step 703', this process of iterative redistribution 716' uses the entire population (the whole set of data usages 704a') via step 709' or forecasted/anticipated data usage 704b' via step 705' which may be derived from the data usage 704a', and iteratively searches a better partitioning by moving the partitioning boundaries via step 716'. This process 716' may continue until two consecutive iterations yield the same partitioning.

The decision-making component 720' also receives rules for allowing retroactive assignment of optimal rate plans vis step 707' from retroactive rules database 718' and feeds the decision to rule inference 706'.

The rule inference 706' derives the optimal cut-off rules 708' via steps 715' from the resource usage distribution 704a' or forecasted/anticipated data usage 704b'.

The final step of assigning devices to the optimal rate plans is illustrated as step 719'. The optimal rate plans are selected by looking up the Cutoff Rules 708' against the data usage of the devices 704a' or forecasted/anticipated data usage.

The cut-off rules 708' may include lower and/or upper bounds for each customer rate plan 702' respectively as illustrated on FIG. 6 and described in detailed description accompanying FIG. 6, and are used via step 713' along with data usage 704a' or forecasted/anticipated data usage 704b' via step 717' to generate the optimal assignments 710' of customer rate plan to a device for minimal cost via step 719' respectively resulting in final assignment of customer rate plan to a device 712'. For example, if data usage of a device is between CutOff_j−1 and CutOff_j, as illustrated in FIG. 6, Rate_Plan_j will be assigned for the device via step 719' for CuRP. Once the devices are assigned to the optimal rate plan, the data usage by those devices is billed according to the optimal rate plan to which the devices are assigned to.

Figure 8:
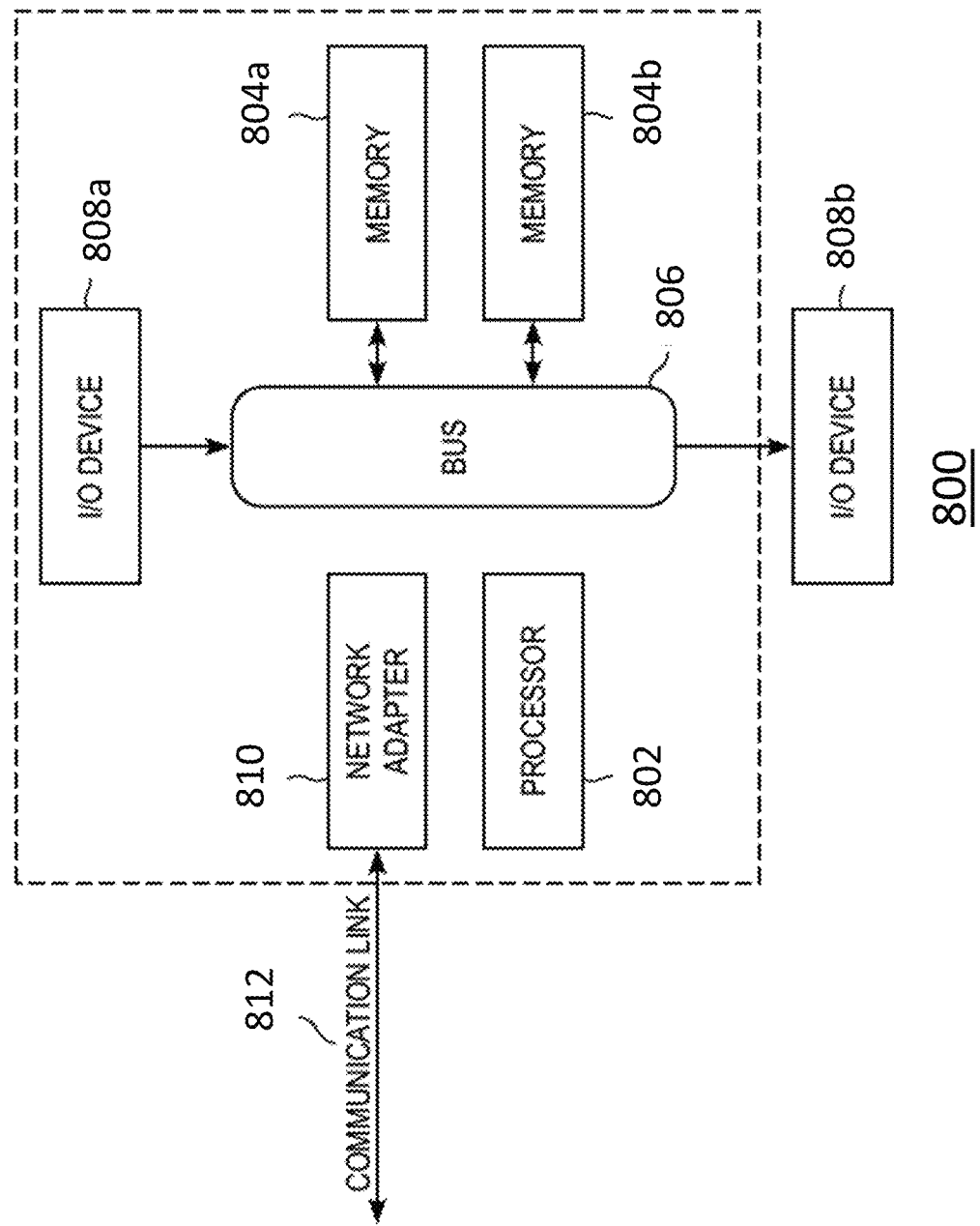
FIG. 8 illustrates a data processing system 800 suitable for storing the computer program product and/or executing program code in accordance with an embodiment of the present invention.

FIG. 8 illustrates a data processing system 800 suitable for storing the computer program product and/or executing program code in accordance with an embodiment of the present invention. The data processing system 800 includes a processor 802 coupled to memory elements 804a-b through a system bus 906. In other embodiments, the data processing system 800 may include more than one processor and each processor may be coupled directly or indirectly to one or more memory elements through a system bus.

Memory elements 804a-b can include local memory employed during actual execution of the program code, bulk storage, and cache memories that provide temporary storage of at least some program code in order to reduce the number of times the code must be retrieved from bulk storage during execution. As shown, input/output or I/O devices 808a-b (including, but not limited to, keyboards, displays, pointing devices, etc.) are coupled to the data processing system 800. I/O devices 808a-b may be coupled to the data processing system 800 directly or indirectly through intervening I/O controllers (not shown).

In FIG. 8, a network adapter 810 is coupled to the data processing system 802 to enable data processing system 802 to become coupled to other data processing systems or remote printers or storage devices through communication link 812. Communication link 812 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include DVD, compact disk-read-only memory (CD-ROM), and compact disk—read/write (CD-R/W). To describe the features of the present disclosure in more detail refer now to the following description in conjunction with the accompanying Figures.

As used herein, the term device in one or more embodiments may include Internet of Things (IoT) device capable of communication, machine to machine (M2M) device capable of communication, automobile, mobile transport equipment, industrial equipment, medical device, or device having a communication system, ECU, or similar, to provide data across a communication protocol.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application (i.e., app) or similar while the primary software and data are stored on servers or locations apart from the devices.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI), and one or more wired networks.

What is claimed is:

1. A computer-implemented method for assigning one or more devices operative on a communications network to an optimal rate plan, comprising:
   identifying the one or more rates plans of the one or more devices;
   tracking communications network usage of each device of the one or more devices via communication gateway to identify one or more usage characteristics of each device;
   identifying a usage profile for the one or more devices, wherein the usage profile for the one or more devices includes usage characteristics for the one or more devices;
   comparing the tracked usage profile for the one or more devices to one or more available rate plans;
   determining an optimal rate plan for the one or more devices from the available rate plans; and
   dynamically assigning the one or more devices to the optimal rate plan.

2. The method of claim 1, wherein the usage profile for the one or more devices is actual usage or anticipated data usage and wherein the one or more usage characteristics includes one or more of use of bandwidth, use of data, frequency of calls, length of calls, amount of data used, data uploads, data downloads, data transmissions, voice transmissions, types of data used, amount of data traffic, incoming data traffic, outgoing data traffic, type of data plan, history of data usage, and history of cost of data plan.

3. The method of claim 2, wherein the step of comparing further includes analyzing the one or more rate plans available for the one or more devices by at least one rate plan characteristic.

4. The method of claim 3, wherein the rate plan characteristic is one or more of a grouping, a pooling, and an individualized plan.

5. The method of claim 4, wherein the usage profile for the one or more devices includes information regarding one or more of individual devices, device groups, rate plans, usage pools, account information for the account the one or more devices belong to and account overview for the account the one or more devices belong to.

6. The method of claim 5, wherein the optimal rate plan is determined to be one of the available rate plans in relation to the usage characteristics as the optimal rate plan provides a lower cost over a predetermined period of time, wherein the predetermined time period is one of a day, week, month, quarter, semi-annual, or annual period.

7. The method of claim 1, wherein the one or more devices are automatically assigned to the optimal rate plan retroactively.

8. A system for assigning one or more devices operative on a communications network to an optimal rate plan, comprising one or more devices, a processor, a database storing usage records for the one or more devices and one or more available rate plans, wherein the processor is provided with the instructions to:
- identify the one or more rates plans of the one or more devices;
- track communications network usage of each device of the one or more devices via communication gateway to identify one or more usage characteristics of each device;
- identify a usage profile for the one or more devices, wherein the usage profile for the one or more devices includes usage characteristics for the one or more devices;
- compare the tracked usage profile for the one or more devices to one or more available rate plans;
- determine an optimal rate plan for the one or more devices from the available rate plans; and
- dynamically assign the one or more devices to the optimal rate plan.

9. The system of claim 8, wherein the usage profile for the one or more devices is actual usage or anticipated data usage and wherein the one or more usage characteristics includes one or more of use of bandwidth, use of data, frequency of calls, length of calls, amount of data used, data uploads, data downloads, data transmissions, voice transmissions, types of data used, amount of data traffic, incoming data traffic, outgoing data traffic, type of data plan, history of data usage, and history of cost of data plan.

10. The system of claim 9, wherein the step of comparing further includes analyzing the one or more rate plans available for the one or more devices by at least one rate plan characteristic.

11. The system of claim 10, wherein the rate plan characteristic is one or more of a grouping, a pooling, and an individualized plan.

12. The system of claim 11, wherein the usage profile for the one or more devices includes information regarding one or more of individual devices, device groups, rate plans, usage pools, account information for the account the one or more devices belong to and account overview for the account the one or more devices belong to.

13. The system of claim 8, wherein the optimal rate plan is determined to be one of the available rate plans in relation to the usage characteristics as the optimal rate plan provides a lower cost over a predetermined period of time, wherein the predetermined time period is one of a day, week, month, quarter, semi-annual, or annual period.

14. The system of claim 8, wherein the one or more devices are automatically assigned to the optimal rate plan retroactively.

15. A computer program product stored on a computer readable medium, comprising: computer readable instruction for causing a computer to control an execution of an application to perform a method for assigning one or more devices operative on a communications network to an optimal rate plan, comprising:
- identifying the one or more rates plans of the one or more devices;
- tracking communications network usage of each device of the one or more devices via communication gateway to identify one or more usage characteristics of each device;
- identifying a usage profile for the one or more devices, wherein the usage profile for the one or more devices includes usage characteristics for the one or more devices;
- comparing the tracked usage profile for the one or more devices to one or more available rate plans;
- determining an optimal rate plan for the one or more devices from the available rate plans; and
- dynamically assigning the one or more devices to the optimal rate plan.

16. The computer program product of claim 15, wherein the usage profile for the one or more devices is actual usage or anticipated data usage and wherein the one or more usage characteristics includes one or more of use of bandwidth, use of data, frequency of calls, length of calls, amount of data used, data uploads, data downloads, data transmissions, voice transmissions, types of data used, amount of data traffic, incoming data traffic, outgoing data traffic, type of data plan, history of data usage, and history of cost of data plan.

17. The computer program product of claim 16, wherein the step of comparing further includes analyzing the one or more rate plans available for the one or more devices by at least one rate plan characteristic.

18. The computer program product of claim 17, wherein the rate plan characteristic is one or more of a grouping, a pooling, and an individualized plan.

19. The computer program product of claim 18, wherein the usage profile for the one or more devices includes information regarding one or more of individual devices, device groups, rate plans, usage pools, account information for the account the one or more devices belong to and account overview for the account the one or more devices belong to.

20. The computer program product of claim 19, wherein the optimal rate plan is determined to be one of the available rate plans in relation to the usage characteristics as the optimal rate plan provides a lower cost over a predetermined period of time, wherein the predetermined time period is one of a day, week, month, quarter, semi-annual, or annual period.

21. The computer program product of claim 15, wherein the one or more devices are automatically assigned to the optimal rate plan retroactively.

* * * * *